Patented Dec. 22, 1953

2,663,724

UNITED STATES PATENT OFFICE 2,663,724

NONCATALYTIC CONDENSATION OF AROMATIC COMPOUNDS WITH UNSATURATED ORGANIC COMPOUNDS

Herman Pines and Vladimir N. Ipatieff, Chicago, Ill., assignors to Universal Oil Products Company, Chicago, Ill., a corporation of Delaware No Drawing. Application March 30, 1950, Serial No. 152,992

9 Claims. (Cl. 260—465)

This invention relates to the condensation of unsaturated organic compounds with aromatic compounds, and to products and derivatives of products thereby produced. It is more particularly concerned with the condensation of unsaturated organic compounds with substituted carbocyclic or heterocyclic aromatic ring compounds, in which the substituent is an organic radical containing an activating group.

The condensation of aromatic compounds with unsaturated organic compounds, such as the alkylation of aromatic hydrocarbons with olefins, has been the subject of extensive investigation over a considerable period of time. Catalysts of one type or another have been used to induce the reaction and to aid the selectivity thereof. In these reactions, nuclear condensation always is effected. For example, in the catalytic alkylation of substituted aromatic compounds such as benzene compounds in which an organic radical is attached to a carbon atom of the ring, the entering alkyl group attaches to the aromatic nucleus. No direct method of introducing the alkyl group into the organic radical or side chain has heretofore been known. The present invention relates to a method of accomplishing this reaction with certain types of aromatic compounds that are reactable under relatively mild operating conditions.

It is an object of this invention to condense an unsaturated organic compound with an aromatic compound selected from the group consisting of substituted carbocyclic and heterocyclic aromatic ring compounds, in which the substituent is an organic radical containing an activating group.

It is another object of the present invention to condense, in the absence of added catalyst, an unsaturated organic compound with an aromatic compound selected from the group consisting of substituted carbocyclic and heterocyclic aromatic ring compounds in which the substituent is attached to a nuclear carbon atom by a saturated carbon atom to which is attached at least one hydrogen atom, and in which the substituent contains a functional group.

Still another object is to non-catalytically condense a compound selected from the group consisting of olefinic and acetylenic hydrocarbons and derivatives thereof with a side-chain-substituted alkylaromatic hydrocarbon in which the substituent comprises a functional group.

A further object of this invention is to provide a method for producing, by direct condensation, substituted aromatic compounds that are otherwise difficultly preparable.

In a broad aspect, our invention comprises condensing an unsaturated organic compound with a substituted aromatic compound in which the substituent is an organic radical containing an activating or functional group, in the absence of added catalyst. The condensation is effected at elevated temperatures and, usually, at superatmospheric pressures, in the absence of catalysts that promote nuclear condensation of aromatic compounds. We sometimes refer to this type of reaction as thermal condensation or thermal alkylation. Our invention also includes the preparation of substituted aromatic compounds of particular structural configuration, useful per se and as starting materials for the preparation of other chemical substances.

In one embodiment our invention relates to a process which comprises thermally reacting a substituted aromatic compound, in which the substituent is an organic radical containing an activating group, with an unsaturated organic compound at condensation conditions.

In a more specific embodiment our invention relates to a process which comprises thermally reacting an aromatic compound having the following structure:

where A represents an aromatic radical, R' is a member of the group consisting of hydrogen and organic radicals, and R represents the substituted hydrocarbon radical, said substituent comprising a functional group, with an unsaturated organic compound at condensation conditions.

In another specific embodiment our invention relates to a process which comprises thermally reacting a side chain-substituted alkylaromatic compound in which the carbon atom alpha to the aromatic ring is attached to at least one hydrogen atom and is also attached by a single bond to a carbon atom connected by a multiple bond to an oxygen, nitrogen, or sulfur atom, with an unsaturated organic compound at condensation conditions.

The compounds with which unsaturated organic compounds are condensed in our process comprise substituted aromatic compounds in which the substituent is an organic radical containing an activating group. The preferred type of substituted aromatic compound is one in which the substituent is attached to a nuclear carbon atom by a saturated carbon atom to which is attached at least one hydrogen atom and in which the functional group or activating group is on the beta carbon atom of the substituent. By the term aromatic compound we mean to include not only benzene derivatives, naphthalene derivatives, and the like, but also all substituted compounds containing a stable ring or nucleus such as is present in benzene and which possess unsaturation in the sense that benzene does. Consequently it can be seen that the term substituted aromatic compound, in the sense in which it is used in this specification and the appended claims, includes not only substituted carbocyclic compounds but also substituted heterocyclic compounds having stable nuclei. The carbocyclic compounds may have a benzene, naphthalene, anthracene, etc., nucleus. The heterocyclic aromatic compounds may have a pyridine, furan, thiophene, pyrrole, pyrazole, etc., nucleus. In addition, the substituted aromatic compounds contemplated for use in our process may contain both a carbocyclic and a heterocyclic ring such as is found in indole and in carbazole. Also, the aromatic compounds may contain both a benzene nucleus and a cycloalkane nucleus such as is found in tetralin and in indan. In compounds of this type the cycloalkane nucleus may be regarded as the substituent.

As hereinbefore stated, the aromatic compounds preferred for use in our process contain a substituent or side chain, said substituent or side chain containing an activating or functional group and, preferably, being attached to a nuclear carbon atom by a saturated carbon atom, i. e., a carbon atom that is bonded by univalent bonds to four atoms. It is preferred that the saturated carbon atom should have at least one hydrogen atom attached thereto. Also, it is preferred that the functional group be attached to the beta carbon atom of the substituent or side chain. We have found that aromatic compounds that meet these limitations are reactable with unsaturated organic compounds at comparatively mild operating conditions. The functional group on the beta carbon atom activates the hydrogen atom or atoms on the alpha carbon atom and condensation takes place at temperatures and pressures substantially below those required with corresponding compounds that possess no functional group. For example, in order to bring about the side chain alkylation of normal propylbenzene with ethylene it is necessary to have a temperature of at least about 400–450° C. and a pressure exceeding about 1000 pounds per square inch. On the other hand, phenylacetone, which can be regarded as normal propylbenzene in which the hydrogen atoms on the second carbon atom of the side chain have been replaced with oxygen, a functional group, reacts with ethylene to form 3-phenyl-2-pentanone at 200° C. and moderate pressures.

It is believed that the phenyl group also tends to activate the hydrogen atom or atoms on the alpha carbon atom. Consequently, if the activating or functional group is attached to a carbon atom that is farther removed from the aromatic nucleus than the beta carbon atom, the point of condensation will not always be at the alpha carbon atom. For example, if (4-cyanobutyl)-benzene, also known as delta phenylvaleronitrile, is contacted with ethylene at condensation conditions, the phenyl group tends to activate the hydrogen atoms on the alpha or number 1 carbon atom of the side chain whereas the cyano group tends to activate the hydrogen atoms on the number 4 carbon atom of the side chain.

In such a case, condensation might take place at either the 1 carbon atom or the 4 carbon atom or at both carbon atoms. However, as hereinbefore stated, the preferred aromatic compounds are those in which the functional group is attached to the beta carbon atom, because in such instances the activating effect of the functional group and the phenyl group are cumulative with respect to the hydrogen atom or atoms on the alpha carbon atom.

A preferred type of aromatic compound for use in our process has the following structure:

where A represents an aromatic radical, R' is a member of the group consisting of hydrogen and organic radicals, and R represents a substituted hydrocarbon radical, the substituent comprising a functional or activating group. The aromatic radical may contain other substituents such as a chloro group, a methoxy group, an ethoxy group, a nitro group, and the like. Suitable functional groups that have an activating influence on the hydrogen atoms attached to adjacent carbon atoms include:

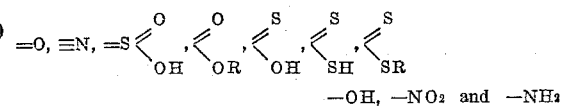

—OH, —NO₂ and —NH₂

In general, we prefer substituted aromatic compounds in which the beta carbon atom of the substituent is connected by a multiple bond to an oxygen, nitrogen, or sulfur atom.

As hereinbefore stated the aromatic reactants employed in our process are condensed with unsaturated organic compounds. Two preferred classes of unsaturated organic compounds comprise organic compounds containing an ethylenic group and organic compounds containing an acetylenic group. For the purposes of our invention, aromatic compounds such as benzene are not regarded as being unsaturated. Examples of unsaturated organic compounds suitable for use in our process include olefins such as ethylene, propylene, 1-butene, 2-butene, and isobutylene; dienes such as butadiene and 2-methylpentadiene; polyolefins containing more than two pairs of double bonds per molecule; cycloolefins and cyclodienes such as cyclopentene, cyclohexene, and cyclohexadiene; acetylenic hydrocarbons such as acetylene and methylacetylene; unsaturated acids and anhydrides such as maleic acid and maleic anhydrides; unsaturated esters such as alkyl esters of maleic acid, and ethylacrylate; unsaturated ketones such as mesityl oxide; alkenylaromatics, such as styrene; and compounds such as allylamine, methylallylsulfide, methylallylchloride, allylcyanide, acrylonitrile, alphacyanoacrylonitrile, and the like.

The presence of the functional group in the side chain of the aromatic compound greatly reduces the pressure necessary to bring about condensation with saturated organic compounds. The pressure required will depend to a considerable extent upon the particular reactants employed. For example, with a substituted aromatic compound such as phenylacetone, in which the alpha carbon atom has a hydrogen atom attached thereto in which a functional group is attached to the beta carbon atom, a pressure as low as atmospheric may sometimes be employed with particular unsaturated organic compounds such as, for example, reactive, high boiling olefins. In such instances, atmospheric reflux temperatures often will suffice to bring about the desired condensation reaction. On the other hand, with lower boiling unsaturated organic compounds and with substituted aromatic compounds that contain activating groups in the side chain which are less potent, somewhat higher pressures must be employed. Ordinarily, the necessary pressures seldom will exceed about 1000 pounds per square inch, although higher pressures are not necessarily disadvantageous.

The temperature at which our process is conducted is dependent to a large extent upon the reactants that are being employed. The position and nature of the functional group in the substituted aromatic compound will have an effect as will the particular type of unsaturated organic compounds. In general, however, the reaction temperatures employed in our process will be from about 150° C. to about 500° C.

Additional details and advantages of our invention will be apparent from the following examples, which are given for purposes of illustration and not for purposes of limitation.

*Example I*

Normal propylbenzene and ethylene, in an aromatic to olefin ratio of 3.0, were contacted in a rotating autoclave in three experiments at temperatures of approximately 350°, 400°, and 450° C., a time of three hours and at pressures substantially in excess of 1500 p. s. i. Substantially no aromatic-olefin condensation product was recovered from the reaction mixture in the experiments conducted at 350° and 400° C. The product recovered from the experiment conducted at 450° C. contained 3-phenylpentane in a yield of 25% based on total olefins reacted. Approximately 80% of the ethylene reacted.

In another experiment 73 grams of phenylacetone was placed in a 300 cc. autoclave, and 56 atmospheres of ethylene was impressed into the same. The temperature of the autoclave was raised to 200° C. and maintained at that temperature for 3.2 hours. The autoclave was cooled and 106 grams of liquid product was recovered therefrom, of which 27 grams represented unreacted phenylacetone. Thus, 46 grams or 63% of the phenylacetone reacted. The product was analyzed and was found to contain 19.2 grams of 3-phenyl-2-pentanone and 16.2 grams of 3-phenyl-2-heptanone.

A comparison of the results obtained with normal propylbenzene with the result obtained with phenylacetone shows that the latter reacts at a substantially lower temperature than does the former. This is ascribed to the presence of the functional group (=O) on the beta carbon atom of the side chain of the phenylacetone.

*Example II*

59 grams of phenylacetonitrile was placed in a 300 cc. autoclave and thereafter 60 atmospheres of ethylene was pressed thereinto. The autoclave was heated to a temperature of 225° C. and maintained at that temperature for five hours. After cooling, the liquid product was recovered and 12 grams thereof was found to boil at 96–100° C., the $n_D^{20}$ of this fraction was 1.5019. This material was established as alpha-phenylbutyronitrile. It can be seen that the ethylene group condensed with the alpha carbon atom of the phenylacetonitrile and that a valuable compound was prepared by direct alkylation.

From the foregoing description, it can be seen that our process possesses a number of advantages. For example, no catalyst is required with the result that the initial and the handling costs associated with catalyst in catalytic processes are avoided. In addition, the bulk separation of product and catalyst as well as the necessity of removing traces of catalyst contamination from the product, also are avoided. More than this, corrosion problems that frequently are associated with the use of certain types of catalyst are nonexistent in our process. Finally, there is no used catalyst disposal problem.

An additional and important advantage lies in the fact that by our process we are able to directly and inexpensively prepare compounds that are otherwise difficult to synthesize. These compounds are useful as such and often are useful in the preparation of more complicated chemical compounds..

We claim as our invention:

1. A process for the side chain alkylation of a substituted aromatic compound which comprises thermally and non-catalytically reacting at a condensation temperature of from about 150° to about 500° C. an unsaturated organic compound selected from the group consisting of ethylenic and acetylenic hydrocarbons with an aromatic compound having a substituted hydrocarbon side chain having at least one hydrogen atom on the alpha carbon atom and having attached to its beta carbon atom by a multiple bond an element selected from the group consisting of oxygen, nitrogen and sulfur, whereby to condense the aromatic compound with said unsaturated compound at said alpha carbon atom.

2. The process of claim 1 further characterized in that said unsaturated organic compound is an acetylenic hydrocarbon.

3. The process of claim 1 further characterized in that the unsaturated organic compound is an ethylenic hydrocarbon.

4. The process of claim 1 further characterized in that said unsaturated organic compound is a monoolefin.

5. The process of claim 1 further characterized in that said unsaturated organic compound is a monoolefin containing a terminal double bond.

6. The process of claim 1 further characterized in that said unsaturated organic compound is ethylene.

7. The process of claim 1 further characterized in that said unsaturated organic compound is acetylene.

8. The process of claim 1 further characterized in that said aromatic compound is a benzene compound.

9. The process of claim 1 further characterized in that said side chain is a substituted alkyl radical.

HERMAN PINES.
VLADIMIR N. IPATIEFF.

References Cited in the file of this patent

UNITED STATES PATENTS

| Number | Name | Date |
|---|---|---|
| 2,569,132 | Melstrom et al. | Sept. 25, 1951 |

OTHER REFERENCES

Abdullah: J. Indian Chem. Soc., vol 12, pages 62–66 (1935). Abstracted in Chemical Abstracts, vol. 29, col. 3995 (1935).